TRACKING SKI
Original Filed Nov. 10, 1966 2 Sheets-Sheet 1
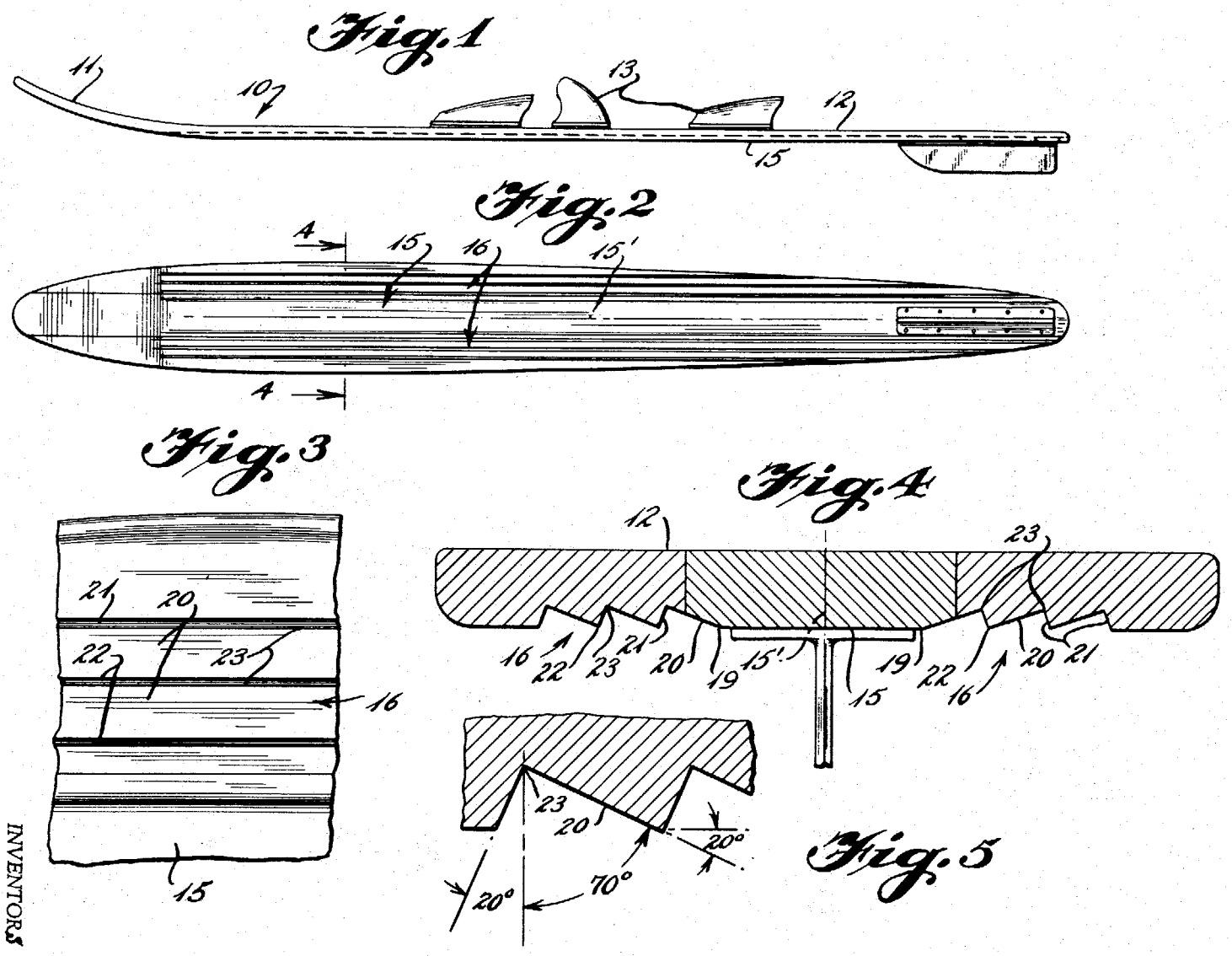
INVENTORS
RICHARD D. POPE, JR. and
SANFORD L. FAUGHT
BY
ATTORNEYS

TRACKING SKI

Original Filed Nov. 10, 1966 2 Sheets-Sheet 2

INVENTORS
RICHARD D. POPE, JR.
SANFORD L. FAUGHT

BY [illegible]
ATTORNEYS

United States Patent Office

Re. 27,235
Reissued Nov. 23, 1971

27,235
TRACKING SKI

Richard D. Pope, Jr., and Sanford L. Faught, Winter Haven, Fla., assignors to Cypress Gardens Skis, Inc., Cypress Gardens, Fla.

Original No. 3,395,411, dated Aug. 6, 1968, Ser. No. 593,474, Nov. 10, 1966. Application for reissue Jan. 8, 1970, Ser. No. 10,664
Int. Cl. A63c *15/00*
U.S. Cl. 9—310 A 6 Claims

Matter enclosed in heavy brackets [ ] appears in the original patent but forms no part of this reissue specification; matter printed in italics indicates the additions made by reissue.

ABSTRACT OF THE DISCLOSURE

A ski having a plurality of longitudinally disposed grooves on its running surface, the grooves being spaced from the longitudinal center of the ski and having relatively wide planing surfaces and relatively narrow reaction surfaces disposed approximately at right angles to each other, the reaction surfaces preventing side slipping during use of the ski.

This invention relates to health and recreation, and more particularly to skis of the types used on water and snow.

In the sport of skiing the participant frequently is required to execute turns or change direction. Various competitive games require the skier to maneuver around objects and points and at varying speeds. Thus in slalom skiing, performed on one ski, a high degree of control is required in order to execute proper turns and prevent spilling. Then too, in water ski jumping it is necessary to make a turn at high speed just prior to going up the ramp in order to achieve the speed required for the jump. Similarly in snow skiing the participant must execute sharp turns at relatively high speed.

Various devices for controlling the skis and reducing sidewise slip on turns have been proposed. However, some of these have required the adding of appendages to the skis and the various means employed have permitted the achieving of only a modicum of control.

Accordingly it is an object of the present invention to provide a ski having grooves arranged therein of such nature that control of the ski is substantially improved, the invention being useful with various types of skis.

Figure 6:
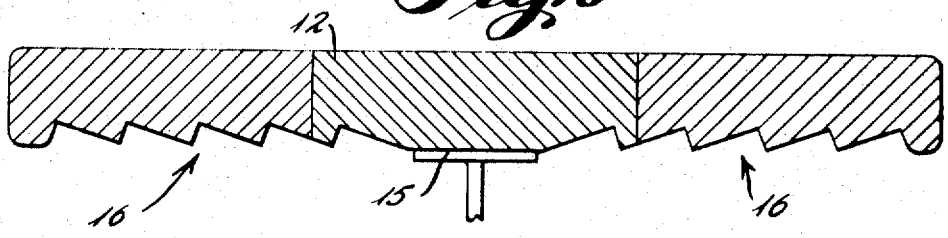
Figure 7:
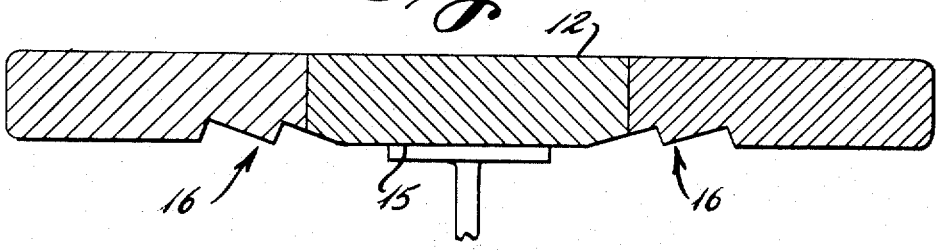
Figure 8:
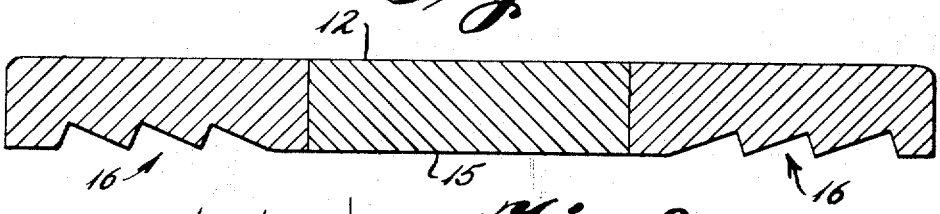
Figure 9:
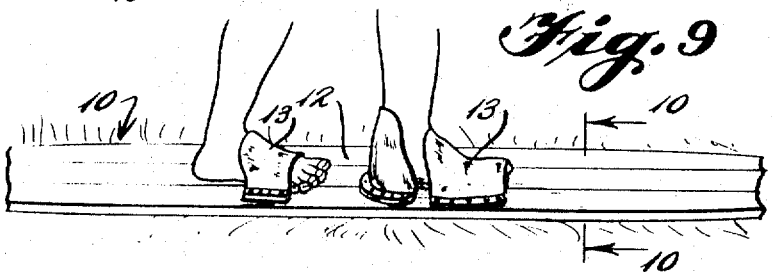
Figure 10:
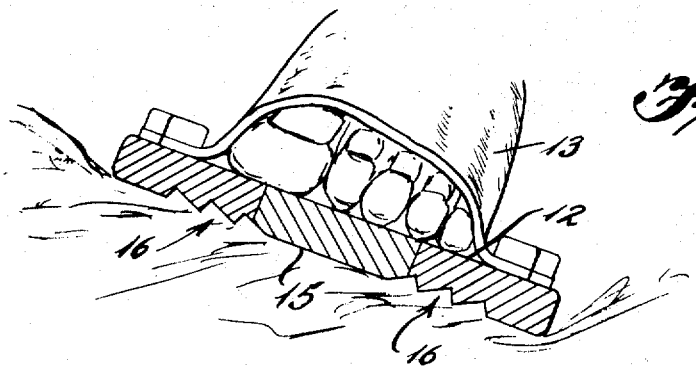

These and other objects of the invention will become apparent from the following description in conjunction with the accompanying drawings in which:

FIG. 1 is an elevation of a ski in accordance with the present invention;

FIG. 2, a plan view of the bottom of the ski of FIG. 1;

FIG. 3, a fragmentary plan view to an enlarged scale of a ski bottom;

FIG. 4, a section to an enlarged scale on the line 4—4 of FIG. 2;

FIG. 5, a fragmentary section illustrating the angular relationship of the grooves;

FIGS. 6 and 7, sections similar to FIG. 4, of modifications;

FIG. 8, a section similar to FIG. 4 illustrating the invention applied to a jumping ski;

FIG. 9, a fragmentary perspective illustrating a manner of use; and,

FIG. 10, and enlarged section on the line 10—10 of FIG. 9.

Briefly stated the ski of the present invention is of the elongated type designed for high speed movement through water or on snow. It has a plurality of grooves on its relatively flat running surface, the grooves being spaced from the center and having relatively wide planing surfaces and relatively narrow reaction surfaces disposed at approximately right angles to each other, the reaction surfaces inclined outwardly at a small acute angle to the perpendicular in order that the grooves may hold against the water or snow and increase the tracking ability of the ski.

With further reference to the drawings, the ski has an elongated main portion 10 and an upwardly curved front tip portion 11. The upper surface 12 is substantially flat for the reception of one or more foot binding or retaining members 13.

The ski illustrated in FIGS. 1 and 2 is tapered from front to rear as is customary with a slalom ski. However, the invention is applicable to skis which may not be tapered, such as aquatic jumping skis and those used in the snow.

The underside of the main portion of the ski has a generally flat running surface 15 with an imaginary center line 15'. In order to increase the tracking ability of the ski a plurality of grooves 16 are provided in the running surface. In the illustration of FIGS. 2–4, three grooves are provided on each side, a total of six. However, as indicated in FIGS. 6 and 7, greater and lesser numbers of grooves may be employed, the selection depending on the performance desired.

The grooves are parallel to the longitudinal axis of the ski in order to promote tracking in that direction.

A typical ski such as illustrated in FIGS. 1–4 has a width across its widest portion of approximately 6½ inches and a thickness of approximately ⅝ inch. From the center line 15' to the inner edge 19 of the first groove a distance of ⅞ inch has been found appropriate.

Each of the grooves has a relatively wide planing surface or wall 20 and relatively narrow wall or reaction surface 21, the walls being disposed at an angle to each other of approximately 90°, forming outer edges or peaks 22 and inner valleys 23. A satisfactory dimension for the width across the outer edges or peaks of each groove is approximately ½ inch. As indicated in FIG. 5, the relatively wide walls 20 are inclined toward the center of the ski at an angle of approximately 70° with a plane which extends perpendicularly to the flat portion of the ski and longitudinally of the ski (or at approximately 20° with the flat running surface of the ski), and the relatively narrow walls are inclined outwardly from the center of the ski at an angle of approximately 20° to said imaginary plane. The depth of the valleys is approximately 5/32 inch.

In the use of the ski as indicated in FIG. 10, the lower side which is on the inside of a turn is naturally inclined which permits the relatively narrow reaction surfaces 21 of the grooves to catch the water or snow and thereby reduce sideslipping and increase the ability of the ski to hold in the proper tracking direction. The ski requires less effort than with ordinary skis for turning, tracks better in smooth or rough water, and bounces less when cutting across a wake. Further, no disadvantage occurs when used by either a left or a right footed skier.

While the dimensions and the angles stated have been found to perform satisfactorily, it is anticipated that slight variations may be made, but with diminishing of the ski's tracking ability.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A ski comprising an elongated ski body having an turned forward end and a generally flat running por-ın, the said running portion having groove means spaced ɔm and extending parallel to the longitudinal center-.e of said running portion, said groove means having aks and valleys, each groove means comprised of a rela-·ely wide wall and a relatively narrow wall, said walls ;posed at approximately 90° to each other, said rela-·ely wide walls being inclined downwardly and inwardly ward the centerline of the ski at an angle of approxi-ıtely 70° with an imaginary plane which extends per-ndicularly and longitudinally of the running portion of ɜ ski, said narrow walls inclined outwardly at an angle approximately 20° to said plane.

2. The invention of claim 1, said groove means com-ised of a plurality of grooves.

3. The invention of claim 2 in which from two to five ɔoves are employed on each side of the centerline.

4. The invention of claim 1, in which each of the ɔoves has a width of approximately 1/12 the maximum dth of the ski, and the valleys have a depth approxi-ıtely 1/4 the thickness of the ski.

5. The invention of claim 1, in which a flat surface approximately 1/4 the width of the ski is provided be-een said groove means along the longitudinal centerline the running surface.

6. A ski comprising an elongated ski body having an turned forward end and a generally flat running [por-ın] *surface,* the said running [portion] *surface* having ɔove means spaced from [an] *and* extending parallel to the longitudinal centerline of said running [portion] *surface,* said groove means comprised of a relatively wide wall and a relatively narrow wall, said relatively wide wall being inclined upwardly *and away from the centerline of the ski* at a relatively small angle from the running surface of the ski and said relatively narrow wall being inclined at a steep angle from the running [portion] *surface* of the ski, whereby when the ski is running at an angle the grooves tend to engage the material through which the ski is running in order to minimize sideslipping.

References Cited

The following references, cited by the Examiner, are of record in the patented file of this patent or the original patent.

UNITED STATES PATENTS

| | | | |
|---|---|---|---|
| 3,118,157 | 1/1964 | Houser | 9—310 A |
| 3,304,095 | 2/1967 | Carlton | 280—11.13 S |
| 3,378,274 | 4/1968 | Poppen | 280—11.13 S X |
| 3,289,227 | 12/1966 | Kelly | 9—310 |

FOREIGN PATENTS

| | | | |
|---|---|---|---|
| 284,100 | 11/1965 | Australia | 9—310 A |
| 88,426 | 2/1937 | Sweden | 280—11.13 S |
| 373,494 | 3/1907 | France. | |
| 1,285,809 | 4/1961 | France. | |
| 1,108,599 | 6/1961 | Germany. | |

MILTON BUCHLER, Primary Examiner

P. E. SAUBERER, Assistant Examiner